(12) United States Patent
Rudley et al.

(10) Patent No.: US 8,197,205 B2
(45) Date of Patent: Jun. 12, 2012

(54) SWASHPLATELESS HELICOPTER BLADE ACTUATION SYSTEM

(75) Inventors: Frank M. Rudley, Lester, PA (US); Evhen M. Mychalowycz, Swarthmore, PA (US); Joseph R. Wagner, Jr., East Norriton, PA (US); Edward J. Glembocki, Media, PA (US)

(73) Assignee: The Boeing Company, Chicago, IL (US)

( * ) Notice: Subject to any disclaimer, the term of this patent is extended or adjusted under 35 U.S.C. 154(b) by 1084 days.

(21) Appl. No.: 12/108,516

(22) Filed: Apr. 24, 2008

(65) Prior Publication Data
US 2009/0269199 A1 Oct. 29, 2009

(51) Int. Cl.
*B64C 27/00* (2006.01)
(52) U.S. Cl. .......................................... 416/1; 416/158
(58) Field of Classification Search .................. 416/147, 416/155, 156, 157 R, 157 A, 158, 1
See application file for complete search history.

(56) References Cited

U.S. PATENT DOCUMENTS

| 4,379,678 | A | * | 4/1983 | Carlock et al. | ................... 416/98 |
| 4,720,059 | A | * | 1/1988 | Stearns, Jr. | .................. 244/17.11 |
| 4,858,490 | A | * | 8/1989 | Grant | ............................... 74/661 |
| 6,099,254 | A | | 8/2000 | Blaas et al. | |
| 6,783,326 | B2 | * | 8/2004 | Weitkamp et al. | ................. 416/1 |
| 7,604,198 | B2 | * | 10/2009 | Petersen | ..................... 244/17.23 |
| 2007/0170307 | A1 | * | 7/2007 | de la Cierva Hoces | ....... 244/7 R |

OTHER PUBLICATIONS

Uwe T.P. Arnold Daniel Fuerst, Tom Neuheuser, Rainer Bartels "Development of an Integrated Electrical Swashplateless Primary and Individual Blade Control System," Sep. 2006, Cheeseman Award Paper presented at the 32nd European Rotorcraft Forum, Maastricht, The Netherlands.

* cited by examiner

*Primary Examiner* — Edward Look
*Assistant Examiner* — Andrew C Knopp
(74) *Attorney, Agent, or Firm* — Novatech IP Law; Sean O'Neill; James Poole

(57) ABSTRACT

A blade actuation system comprises at least one motor coupled to a rotor blade for changing the pitch angle of the rotor blade. The motor is configured to wirelessly communicate with at least one flight control computer to modulate the pitch angle. At least one generator may be mounted on a rotor shaft to generate power during rotation of the rotor shaft. The generator may provide power to the motor. The flight control computer is operative to provide control signals to at least one of the generators and motors for regulation thereof. The flight control computer, motor and generator may be configured to wirelessly communicate with one another.

20 Claims, 6 Drawing Sheets

SWASHPLATELESS HELICOPTER BLADE ACTUATION SYSTEM

CROSS-REFERENCE TO RELATED APPLICATIONS

This invention was made with Government support under Agreement No. W911W6-06-2-0002 for the National Rotorcraft Technology Center Research Program. The Government has certain rights in the invention.

STATEMENT RE: FEDERALLY SPONSORED RESEARCH/DEVELOPMENT (Not Applicable)

FIELD

The following disclosure relates generally to rotorcraft and, more particularly, to a blade actuation system and method for individually controlling the rotor blades of a helicopter.

BACKGROUND

Helicopters include one or more main rotors each having a plurality of rotor blades. The rotor blades are rotatably driven by a drive mechanism such as an engine via a transmission. Helicopter flight is regulated by cyclic and collective control of the angle of incidence or pitch angle of the rotor blades.

In collective control, the pitch angle of the rotor blades is collectively changed all at once such that the amount of lift produced by the rotor blades is altered by the same amount. Collective control is used to change the helicopter's altitude and/or airspeed. In cyclic control, the individual pitch angle of each rotor blade is changed or cycled as the rotor blade rotates such that different amounts of lift are produced at different times during a revolution. Cyclic control is used to change the helicopter's sideways direction (i.e., roll) and forward/aft direction (i.e., pitch).

In prior art helicopters, cyclic and collective control inputs may be generated by pilot command and are provided to the rotor blades through a rotating swashplate. The swashplate is connected to each individual rotor blade through a set of pitch links and pitch horns. The swashplate transmits the pilot's commands from the non-rotating frame of the helicopter (i.e., the fuselage) to the rotating frame (i.e., the rotor hub and rotor blades).

One of the primary problems associated with helicopter flight is excessive amounts of vibration and noise generated by rotation of the main rotor blades. The vibration is transmitted from the rotor hub through the helicopter transmission to produce vibration in the fuselage. Rotor-induced vibration may occur as a result of rotor-induced shear forces and moments acting at the rotor hub and can reduce passenger and crew comfort and cause fatigue damage to structural components of the helicopter. The majority of vibration produced by the rotor blades is transmitted to the rotor hub at an excitation frequency which is an integral multiple of the number of rotor blades in the main rotor. For an n-bladed main rotor, the predominant excitation or vibration frequency at the rotor hub is the "$n^{th}$" harmonic. For example, in a three-bladed main rotor, the predominant vibration frequency is the third harmonic of the rotary frequency of the main rotor.

Rotor-induced noise is typically comprised of a combination of aerodynamic loading noise and turbulence noise and is a function of rotor blade lift and the rotational speed of the main rotor. Rotor-induced noise may also be generated by various aerodynamic phenomena such as blade-vortex-interaction (BVI) wherein one rotor blade passes through the shed tip vortices of a previous rotor blade. Rotor-induced noise can also reduce passenger and crew comfort and is frequently the source of complaints from individuals due to helicopter overflights.

Rotor-induced noise and vibration are also associated with aerodynamic characteristics of a helicopter. Flight performance and efficiency can be limited by the ability to control the pitch angle of the rotor blades. For example, forward speed of the helicopter may be limited by inefficiencies associated with non-optimal pitch angles of the rotor blades at any given point during the revolution of each rotor blade. In order to overcome such performance limitations and to reduce noise and vibration, it is desirable to modulate the pitch angle of each rotor blade as it rotates through its azimuth.

Efforts have been directed toward development of several active control systems for minimizing the magnitude of rotor-induced noise and vibration and to improve aerodynamic performance and efficiency. Such active control systems include high harmonic control (HHC) and individual blade control (IBC). In HHC, high frequency pitch angle changes are induced in the rotor blades to counteract the vibration frequencies produced by the rotor blades.

Unfortunately, due to geometry and configuration constraints of conventional swashplate designs, only certain frequencies (i.e., the $n^{th}$ harmonic of an n-bladed rotor and its immediately adjacent frequencies) can be transmitted to the rotor blades. For example, in a three-bladed rotor, only the third harmonic (i.e., the n-blade harmonic) and the second and forth harmonics (i.e., the immediately adjacent harmonics) can be transmitted to the rotor blades. Other inherent drawbacks such as backlash and friction in the mechanical linkages between the swashplate and the rotor blades limits the overall ability of HHC to counteract vibration.

IBC is another active control system that allows for independent pitch angle modulation of each rotor blade in addition to the pitch angle control inputs provided by a conventional swashplate. In contrast to HHC, IBC provides the ability to counteract a variety of different vibration frequencies other than the predominant frequency (i.e., the $n^{th}$ harmonic of an n-bladed rotor) and its immediately adjacent frequencies. In addition, IBC permits pitch angle adjustments in a variety of signal forms and is not limited to the sinusoidal waveform inputs of conventional swashplate configurations.

One attempt at implementing an IBC actuation system in order to overcome noise and vibration problems is an electromechanical/hydraulic arrangement including a set of electromechanical actuators (EMA's) coupled to the rotor blades. In one embodiment, the EMA's are vertically-oriented in parallel relationship to the rotor shaft and are configured to provide primary flight control inputs (i.e., directional and lift) as well as individual control inputs to adjust the rotor blade pitch angles.

Unfortunately, because each EMA includes only a single, synchronous motor, the ability of the EMA to overcome certain types of failures may be limited. For example, in a "hardover" failure of any one of the motors, the pitch angle of any one blade moves to its extreme position which may compromise the reliability of the aircraft.

A further drawback associated with the above-described EMA configuration is the relative complexity of the electromechanical and hydraulic actuator system. In addition, the EMA configuration is understood to be relatively heavy, bulky and requiring a large amount of maintenance and ground support equipment for servicing and maintaining the multiple hydraulic pumps, hydraulic modules, reservoirs and tubing.

As can be seen, there exists a need in the art for a system and method for individual blade control to reduce helicopter vibration and noise. In addition, there exists a need in the art for a system and method for individual blade control that improves aerodynamic performance and economy and allows for greater flexibility in rotor blade control as compared to conventional swashplate configurations. Finally, there exists a need in the art for a system and method for individual blade control that is highly reliable, light weight, simple in construction and which requires minimal maintenance.

BRIEF SUMMARY

The present invention specifically addresses the above-described needs associated with individual blade control by providing a blade actuation system for a rotorcraft such as a helicopter. The blade actuation system may comprise a rotor drive mechanism such as a transmission having a rotatable rotor shaft extending outwardly from the drive mechanism. A rotor head may comprise a rotor hub which may be mounted on the rotor shaft. The rotor hub may have a plurality of rotor blades extending therefrom.

The blade actuation system comprises at least one and, more preferably, a plurality of motors operatively coupled to the rotor blades. The motors may be provided in sets of three in order to provide triple redundancy for each rotor blade. The motors may be in wireless communication with at least one flight control computer. At least one and, more preferably, a plurality of generators may be provided with the blade actuation system for powering the motors.

Importantly, the blade actuation system disclosed herein is operative to cause the motors to individually rotate the rotor blades about a pitch axis in order to independently change a pitch angle of the rotor blade. The blade actuation system reduces or eliminates rotor-induced noise and vibration and improves individual rotor performance on a per blade basis due to the individually controllable nature of the system.

In addition, the blade actuation system allows for implementation of more complex control law algorithms in effecting pitch angle changes as compared to algorithms applied to swashplate systems for cyclic and collective control. For embodiments that combine the rotating generator with the individually controllable motors, a redundant, full authority, individual blade control system with electromechanical actuation is provided for flight control of the helicopter with a self-contained rotating power generation system.

The blade actuation system may further comprise at least one and, more preferably, a plurality of generators which rotate with the rotor shaft and generate power during rotation thereof for delivery to the motors. The blade actuation system may also comprise at least one and, more preferably, a plurality of flight control computers for triple redundancy. The flight control computers are operative to provide control signals in order to regulate the operation of the generators and motors.

Reliability may be provided through triple redundancy in the components and through the use of wireless and/or hardwired data communication between and among the various components. For example, the flight computer may be in communication with the generators and motors via wireless data communication to provide data to the rotating frame components rather than conventional slip rings as used in swashplate configurations.

By co-locating the generators with the rotor head, power may be easily provided to the motors while avoiding the use of slip rings for power transfer. The motors and generators may be configured as electromechanical devices to simplify the design and eliminate or reduce maintenance costs normally associated with hydraulic systems that are typically implemented in conventional helicopter rotor control systems.

The motors may be positioned in substantially equiangular orientation about the pitch hinge which ties the rotor blade to the rotor hub such as via a tie rod. Each of the motors may have a pitch gear extending from a shaft of the motor. The pitch gear may be operatively coupled to a gear wheel fixed to the pitch hinge. The motor gear wheel is fixedly coupled to the pitch hinge in order to facilitate rotation of the rotor blade about the pitch axis.

Each one of the generators that is rotatable with the rotor shaft may include a pinion gear for engagement with a stationary gear ring. The gear ring may be annular in configuration such that rotation of the rotor shaft causes rotation of the pinion gear and generation of power by the generators. The blade actuation system may comprise three of the flight control computers which are preferably configured to wirelessly and/or hardwire communicate data information to and from the generators and motors.

Each motor is preferably sized for full control such that upon the failure of two of the generators in a three generator arrangement, the system will still function with full pitch angle control of the rotor blades. Likewise, the blade actuation system may be configured such that upon failure of one motor, the motor controllers in the remaining motors detect the failure and shut down the failed motor.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

These and other features of the present invention will become more apparent upon reference to the drawings wherein like numbers refer to like parts throughout and wherein.

DETAILED DESCRIPTION

Figure 1:
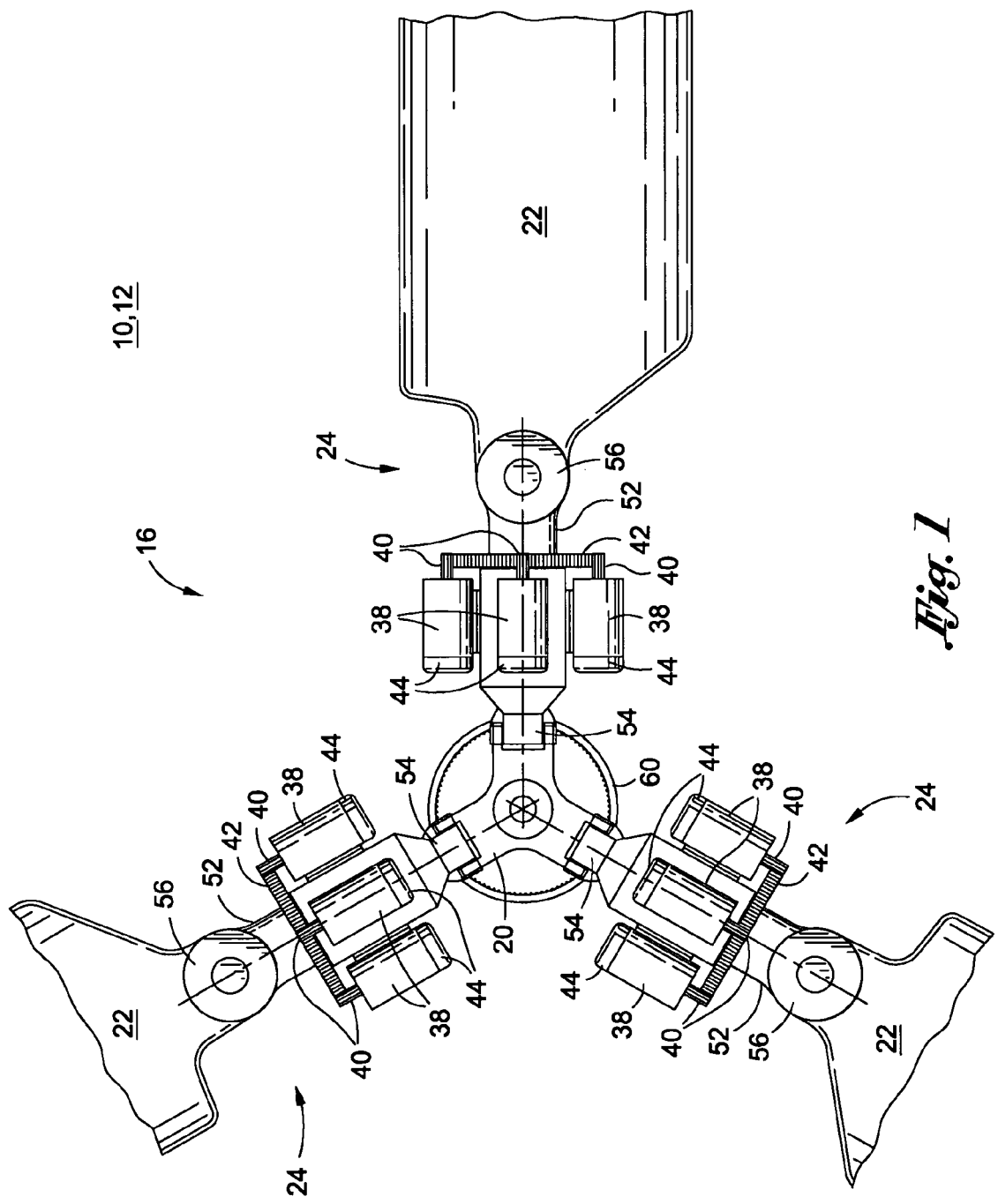
FIG. 1 is a top view of a blade actuation system implemented in a three-bladed rotor.
Figure 2:
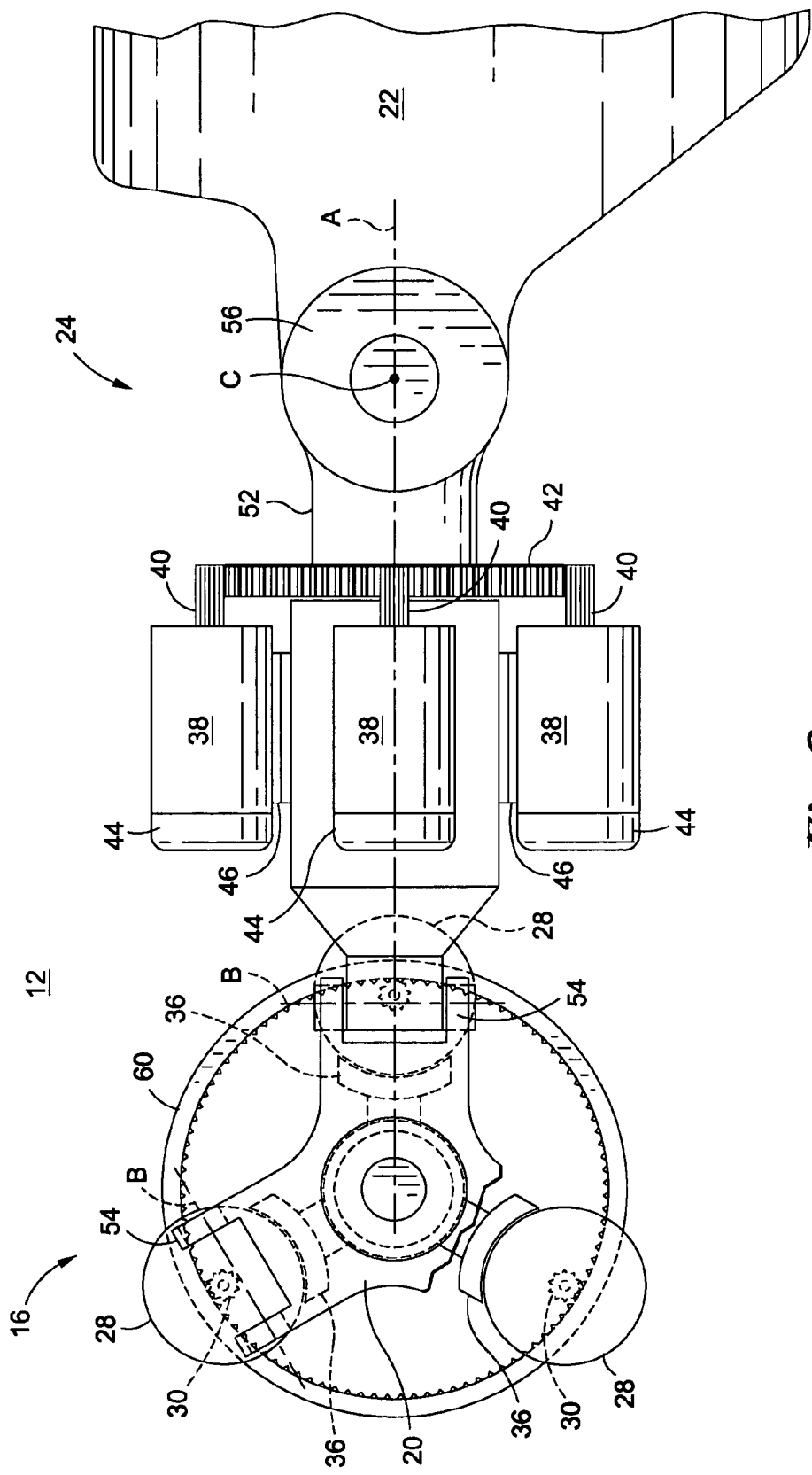
FIG. 2 is an enlarged top view of the interconnection of a rotor blade to a rotor head and illustrating a plurality of motors operatively coupled to the rotor blade for adjusting a pitch angle thereof.

Referring now to the drawings wherein the showings are for purposes of illustrating preferred and various embodiments of the present disclosure only and not for purposes of limiting the same, FIGS. 1-4 illustrate a blade actuation system 12 as may be implemented on a helicopter 10 or other rotorcraft. The rotorcraft or helicopter 10 may comprise a rotor drive mechanism 14 such as an engine and/or transmission as part of a non-rotating frame 64 of the helicopter 10. As part of the rotating frame 62, a rotatable rotor shaft 18 may extend outwardly from the drive mechanism. A rotor hub 20 may be fixedly connected to a rotor head 16 mounted on the rotor shaft 18. A plurality of rotor blades 22 may be connectable to the rotor hub 20.

In one embodiment, the blade actuation system 12 comprises at least one and, more preferably, a plurality of motors 38 which may be operatively coupled to at least one of the rotor blades 22. The motors 38 may be provided in sets of three in order to provide triple redundancy for the motors 38 for each rotor blade although any number of motors 38 may be provided. The motors 38 may be in wireless communication with at least one flight control computer 48 which may be located in the non-rotating frame 64. Importantly, the blade actuation system 12 disclosed herein is operative to cause the motors 38 to individually rotate the rotor blades 22 about a pitch axis A in order to change a pitch angle of the rotor blade 22.

In a further embodiment, the blade actuation system 12 may comprise at least one and, more preferably, a plurality of generators 28 which are configured to rotate with the rotor shaft 18. The generators 28 and motors 38, in one embodiment, are part of the rotating frame 62 of the helicopter 10. The generators 28 may be configured to generate power during rotation of the rotor hub 20 or rotor shaft 18. The motors 38, in one embodiment, may be configured to receive power from the generators 28.

In addition, the blade actuation system 12 may comprise at least one and, more preferably, three or more flight control computers 48 for triple or greater redundancy. The flight control computers 48 are operative to provide primary flight control system (PFCS) control signals which may be input by a pilot-based control input or an automatic flight control system (i.e., AFCS or autopilot) in order to regulate the operation of the generators 28 and motors 38.

Advantageously, because each rotor blade 22 may be independently controlled by the motors 38, the blade actuation system 12 provides an improvement in vibration and noise control as well as an improvement in performance and economy. In this regard, the blade actuation system 12 as disclosed herein reduces or eliminates vibration and improves individual rotor performance on a per blade basis. Furthermore, the implementation of the blade actuation system 12 as disclosed herein allows for more advanced flying quality control law algorithms.

The technical effects of the embodiments disclosed herein include a reduction in vibration due to the increased bandwidth of pitch angle change frequency and direct blade control with increased reliability due to the elimination of components normally required on conventional prior art helicopter 10 rotor systems (i.e., swashplate configurations). Further technical effects of the invention include improved survivability due to reduced part count as compared to swashplate systems and reduced maintenance and ground support equipment requirements.

Reliability is provided, in one embodiment, through triple or greater redundancy in the components and through the use of wireless and/or hardwired data communication between and among the various components. For example, the flight computer may be in communication with the generators 28 via the generator controllers 32 and motors 38 via wireless data communication with the motor controllers 44 to provide data to the rotating frame 62 components rather than conventional slip rings as used in swashplate configurations. The generators 28 may be located in the rotating frame 62 rather than in the non-rotating frame 64 (i.e., fuselage) to facilitate power transfer to the motors 38. The motors 38 and generators 28, in one embodiment, may be configured as electromechanical devices to simplify the design and eliminate or reduced maintenance costs.

Referring to FIGS. 1-4, shown is a top view of the blade actuation system 12 implemented in a three-bladed rotor, such as a main rotor of a helicopter 10. It should be noted here that although FIG. 1 illustrates a three-bladed configuration, the blade actuation system 12 may be implemented on rotors having any number of rotor blades 22. Furthermore, blade actuation system 12 may be implemented on aircraft having more than one main rotor.

Figure 3:
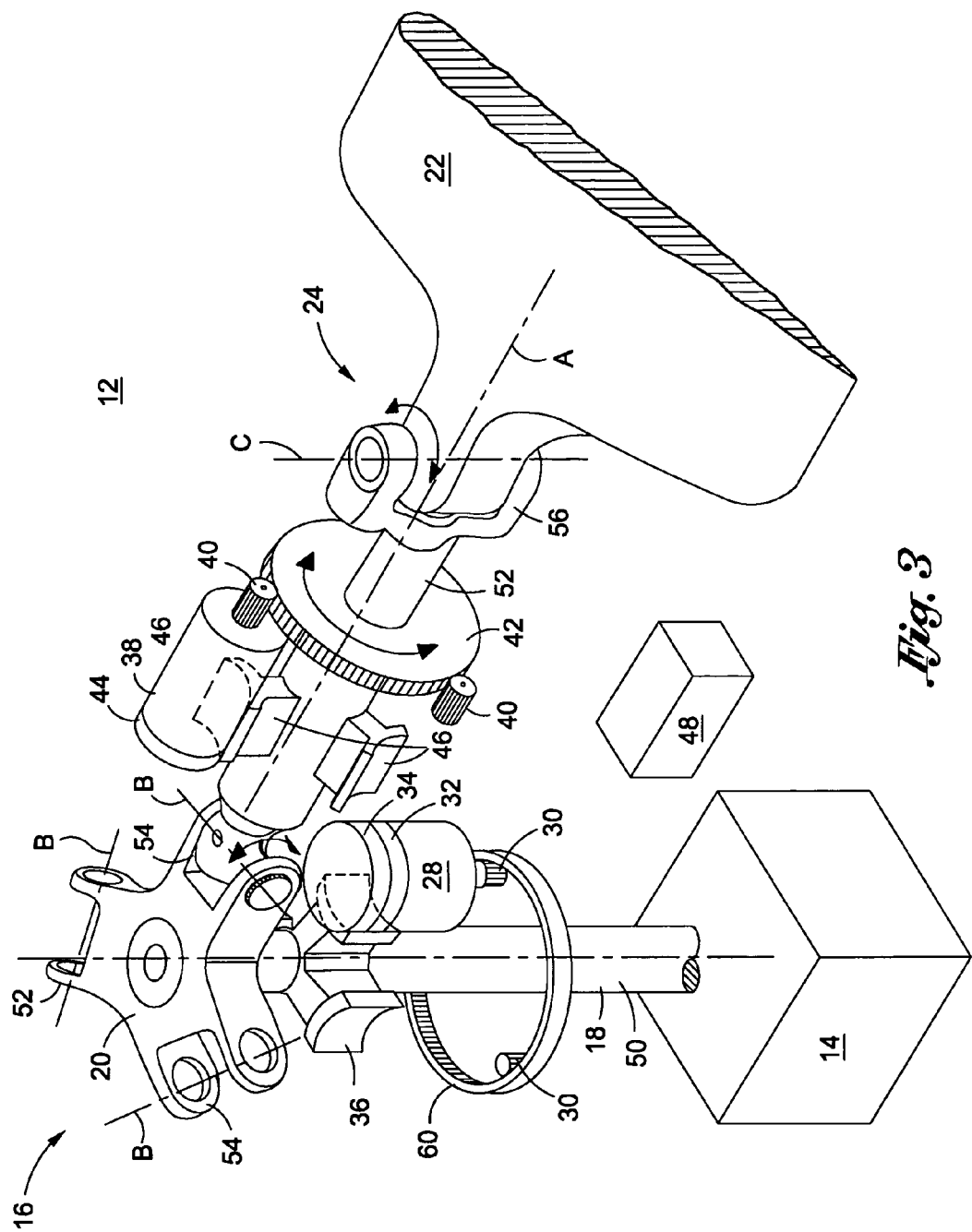
FIG. 3 is a perspective view of the blade actuation system illustrating one embodiment of a generator operatively coupled to a rotor shaft for generating power.

The rotor head 16 may include a plurality of rotor blades 22 which are connectable to the rotor hub 20 and which are configured to be movable about a variety of axes. More particularly, in one embodiment, the rotor blades 22 are preferably articulated to allow for free movement in a variety of directions. For example, as shown in FIG. 3, the rotor blades 22 may be connectable to the rotor hub 20 via a blade mount 24 which may include a lag hinge 56 which facilitates rotation of the rotor blade 22 in the rotatable plane of motion about the lag axis C.

In this manner, the lag hinge 56 facilitates pivoting of the rotor blade 22 in a leading or lagging orientation relative to a radial orientation that the rotor blade 22 may assume under centrifugal force. In addition, the blade mount 24 may further include a pitch hinge 52 to facilitate pitch angle changes of the rotor blade 22 along the feathering or pitch axis A of the rotor blade. Furthermore, the blade mount 24 may include a flap hinge 54 to facilitate essentially free up and down motion of the rotor blade 22 about the flap axis B as best seen in FIG. 3.

However, it should be noted that the blade mount 24 as illustrated in FIG. 1-4 is exemplary only and should not be construed as being limiting in regard to the modes of articulation or lack thereof. For example, it is contemplated that the blade mount 24 may include only the pitch hinge 52 to facilitate rotation of the rotor blade 22 along the pitch axis A. In this regard, the rotor blade 22 is capable of moving or being adjusted in its pitch angle. However, the flap hinge 54 and lag hinge 56 may be omitted such that the rotor blade 22 is fixed in its up and down motion at least at the blade root as well as being fixed in radial orientation.

Referring still to FIGS. 1-4, shown are the motors 38 which, in one embodiment, may be mounted to the rotor hub 20 and which may be operatively coupled to the rotor blades 22. It should also be noted that although the motors 38 are shown as being mounted at the rotor hub 20, other locations are contemplated. For example, the motors 38 may be mounted on the rotor blade 22 itself at the blade root or at any location along the rotor blade 22. However, in order to simplify construction and to minimize centrifugal forces acting on the motors 38 during rotation of the rotor blades 22, the mounting of the motors 38 on the rotor hub 20 is a preferable configuration.

Referring to FIG. 3, it can be seen that the motors 38 may be positioned in substantially equiangular orientation about the pitch hinge 52 via a corresponding number of motor mounting brackets 46. However, it is contemplated that the motors 38 may be integrated into the pitch hinge 52 or the motor mounting brackets 46 may be combined into a unitary mounting structure. Each of the motors 38 can be seen as having a motor gear 40 extending from a shaft of the motor 38. The motor gear 40 may be operatively coupled to the pitch gear 42 via a set of meshing teeth. The pitch gear 42 is fixedly coupled to the pitch hinge 52 in order to facilitate rotation of the rotor blade 22 about the pitch axis A. Regarding the coupling of the motors 38 to the pitch gear 42, a low gear ratio is preferable in order to provide a nearly direct drive concept and thereby minimize losses from backlash or gearing inefficiencies.

Figure 4:
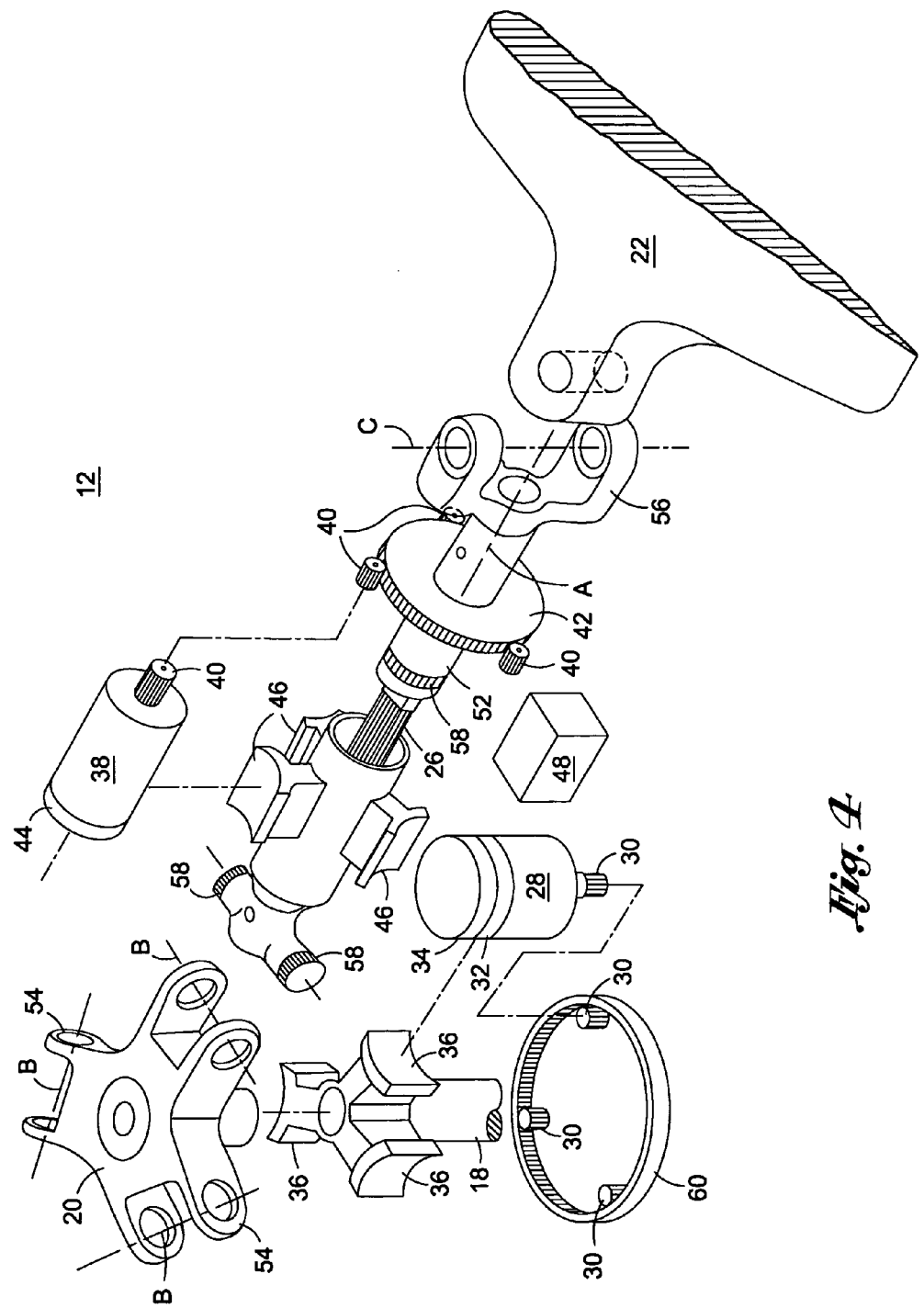
FIG. 4 is an exploded view of the blade actuation system.

Referring to FIG. 4, shown is the blade actuation system 12 for one of the rotor blades 22 in exploded view. As can be seen, the pitch hinge 52 may be rotatably coupled to the outer component of the pitch hinge. A pair of radial and/or axial bearings 58 may be included between the outer portion of the pitch hinge 52 and the inner portion thereof. The bearings 58 of the pitch hinge 52 transfer centrifugal forces and other loads from the rotor blade 22 to the rotor hub 20.

Referring still to FIGS. 1-4, the pitch hinge 52 may be disposed radially inwardly from the lag hinge 56 which, in one embodiment, may comprise a clevis joint which allows for pivoting motion (i.e., up and down motion) of the rotor blade. The clevis fitting may be formed as an integral feature of the rotor hub 20. The rotor hub 20 may be fixed to or integrally formed with the rotor shaft 18. As was earlier mentioned, the generators 28, in one embodiment, may be fixedly coupled to the rotor shaft 18 via a set of generator mounting brackets 36 such that rotation of the rotor shaft 18 causes rotation of each of the generators 28.

As best seen in FIGS. 3-4, each one of the generators 28 may include a pinion gear 30 extending from the generator 28 for engagement with a gear ring 60. The gear ring 60 may be annular in configuration and is non-movably fixed to the rotor craft 10. As such, rotation of the rotor shaft 18 causes rotation of the pinion gear 30 and generation of power by the generators 28. Although the motors 38 and generators 28 are illustrated as having motor gears 40 and pinion gears 30, respectively, which are engageable to the corresponding gear ring 60 and pitch gear 42, a variety of alternative engagement mechanisms are contemplated to facilitate rotational output. For example, it is contemplated that the annular gear ring 60 may comprise a gear ring 60 having teeth disposed on an exterior thereof as opposed to the interior installation shown in FIGS. 3 and 4. Furthermore, the orientation of the motors 38 and gears is exemplary only and should not be construed as limiting the coupling of the motors 38 and generators 28.

Referring still to FIGS. 3-4, the blade actuation system 12 in one embodiment may comprise at least one and, more preferably, three of the flight control computers 48. The flight control computers 48 are preferably configured to wirelessly communicate data information to the generators 28 and motors 38. However, it is contemplated that the flight control computers 48 may be hardwire connected to the generators 28 and motors 38. For wireless communications, any suitable technology may be implemented including, but not limited to, optical, infrared, radio frequency, fiber optic, as well as customized computer networks or any variety of communication systems.

In one embodiment, the blade actuation system 12 as disclosed herein may the generators 28 having n number of the motors 38 operatively coupled thereto. Preferably, the blade actuation system 12 further comprises n quantity of the flight control computers 48 such that where n is equal to three as exemplified in the figures, the blade actuation system 12 comprises three generators 28 providing power to three motors 38 mounted on each of the three rotor blades 22 and which are controlled by three flight control computers 48 such that the motors 38 driving any one of the rotor blades 22 provides triple redundancy.

Figure 5:
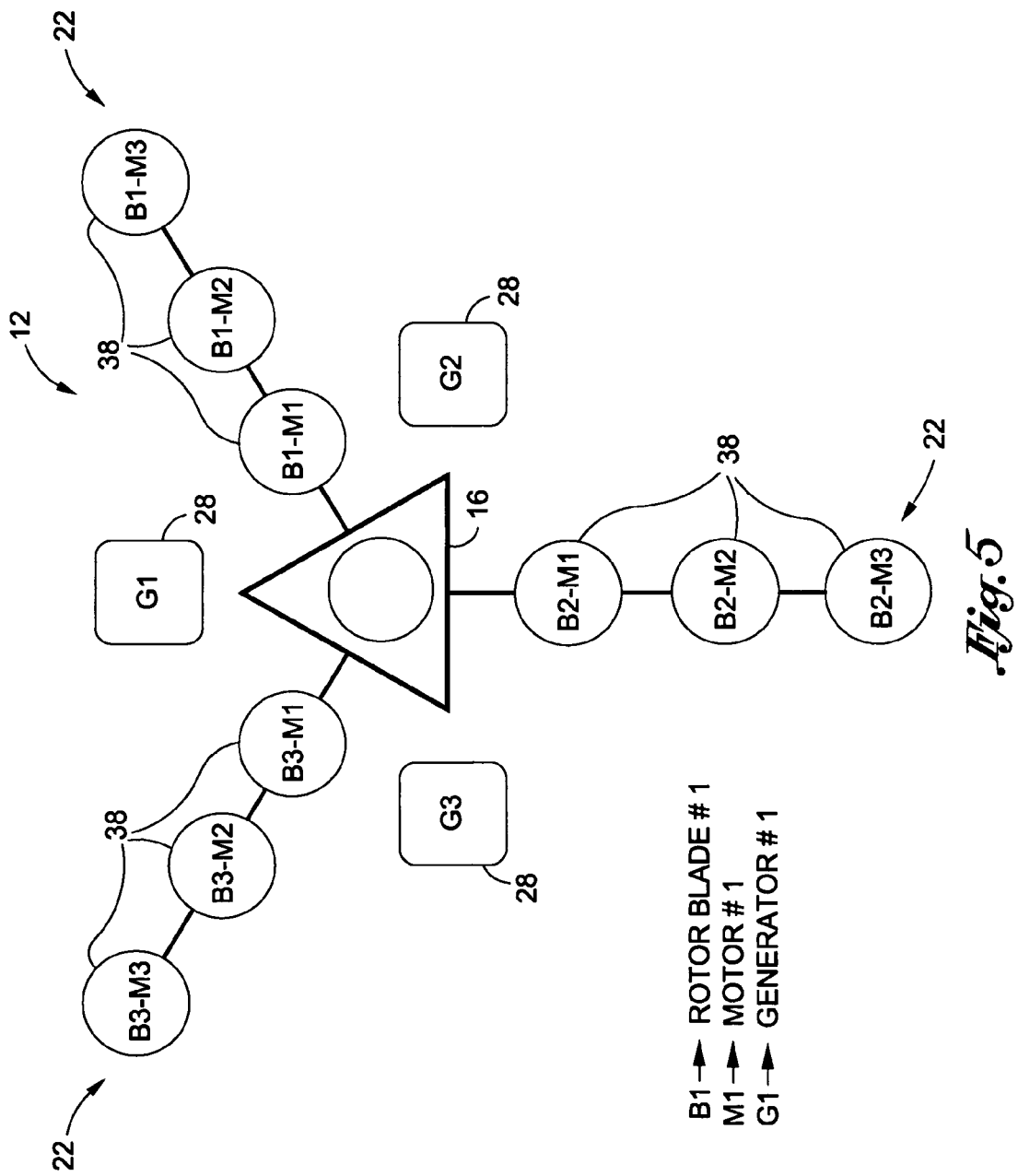
FIG. 5 is a schematic diagram of a set of rotors and generators dedicated to a rotor blade in one embodiment.

Referring to FIG. 5, in one embodiment, the blade actuation system 12 may be configured such that one of the motors 38 from each of the rotor blades 22 is powered by a common one of the generators 28. For example, as shown in FIG. 5, generator 28 indicated by G1 provides power to motors 38 indicated by M1 on each of rotor blades 22 indicated by B1, B2 and B3. Likewise, the generator 28 indicated by G2 provides power to the motors 38 indicated by M2 on each of rotor blades 22 indicated by B1, B2 and B3. The schematic illustration of such an arrangement in FIG. 5 provides that upon failure of any of the generators 28, at least one of the motors 38 in each rotor blade 22 may be shut down or is no longer receiving power from that generator.

However, it is further contemplated that regardless of the number of motors 38 coupled to each of the rotor blades 22, the motors 38 are preferably force-summed in order to provide enough power to allow pitch angle changes by the remaining active or working motors 38 in the event of a hardover failure and not shutoff of one of the three motors 38. It is further contemplated that the motors 38 are force-summed to provide sufficient power to overcome the hardover and not shutoff failed motor 38 which may still be receiving power or which is still active and resisting movement of the other remaining motors 38.

Referring briefly to FIG. 3, it is contemplated that the blade actuation system 12 may comprise a power source 50 located in the rotating frame 62 and which is configured to provide power to the motors 38 during non-rotation of the rotor hub 20. As was earlier mentioned, the generators 28 are configured to rotate with the rotor hub 20 or rotor shaft 18 in order to generate power. Because power may be required for ground operations when the rotor shaft 18 is not turning, the power source 50 as shown in FIG. 3 allows for modulation of the rotor blade 22 pitch angles.

As was earlier mentioned, the exemplary embodiment disclosed herein includes three generators 28 to provide dedicated power to three motors 38 on three separate rotor blades 22. In this regard, the motors 38 are in three different systems so that the failure of one of the generators 28 causes one motor 38 in each of the rotor blades 22 to shut down. It is further contemplated that the generators 28 may be used for alternative functions in the rotor systems such as for de-icing operations or for powering lights or other devices mounted on the rotor blades 22.

For the case where two motors 38 fail for a single rotor blade 22 and the motors 38 are shut off, the remaining motor 38 preferably has a capability for overcoming resistance by the two motors 38 and enabling full control of the rotor blade. As the rotor blade 22 starts turning, the three generators 28 are preferably configured to provide electrical power to the motors 38. Each generator 28 is preferably configured to distribute power to at least one of the motors 38 on each one of the rotor blades 22. As mentioned above, the blade actuation system 12 as disclosed herein is triple redundant such that the operation of one system does not affect the operation of the remaining systems.

Each motor 38 is preferably sized for full control such that upon the failure of two of the generators 28, the system will still function with full performance enabling full pitch angle control of the rotor blade. In one embodiment, the blade actuation system 12 may be configured such that upon failure of one motor, the motor controllers 44 in the remaining motors 38 detect the failure and shut down the failed motor.

In this regard and referring to FIGS. 3-4, each of the motors 38 preferably includes a motor controller 44 as may be located on an end thereof to facilitate communication between the motors 38, the flight control computers 48 and the generators 28. The generators 28 are preferably configured to provide power to the wireless controllers via the power distributors 34 included with each generator. The generators 28 are preferably configured to communicate with each other and with the flight control computers 48 via wireless data communication. However, it is contemplated that the communication between the generator 28 and the flight control communicator may be by hardwired means.

Referring to FIG. 4, it is contemplated that power may be conducted from the generators 28 through a tie bar 26 which is typically configured to serve as the primary load path for loads transmitted from the rotor blade 22 to the rotor hub 20. In one embodiment, the tie bar 26 may be fabricated as a laminated member such that insulating material may interposed between laminated layers for electrically insulating conducting wires or cables passing therethrough. However, it is also contemplated that the power may be provided to the motors 38 by means of flexible wiring which is adapted to conduct power through the flap hinge 54 and pitch hinge.

The flight control computers 48 may be configured to acquire sensor data such as data regarding environment and flight characteristics of the aircraft as well as acquire flight input or commands from the automated flight control system in order to provide flight control signals for regulating the motors 38. The blade actuation system 12 is preferably configured such that upon failure of one of the motors 38, the controllers from that system shall detect the failure and shutdown the failed motors 38. Likewise, the remaining motors 38 may detect the failure of the motor 38 and shut down the failed motor.

The flight control computer 48 may be further configured to provide failure status and provide built in testing to verify the proper operation of the system such as prior to takeoff. In this regard, the blade actuation system 12 may include a robust fault tolerance network with error-correcting codes in order to eliminate the possibility of loss in data communications. Upon loss of communications, however, with the main flight control system located in the fuselage, the controllers on each of the motors 38 are preferably configured to wirelessly locate and detect air frame sensors in order to provide or maintain control of the aircraft.

Figure 6:
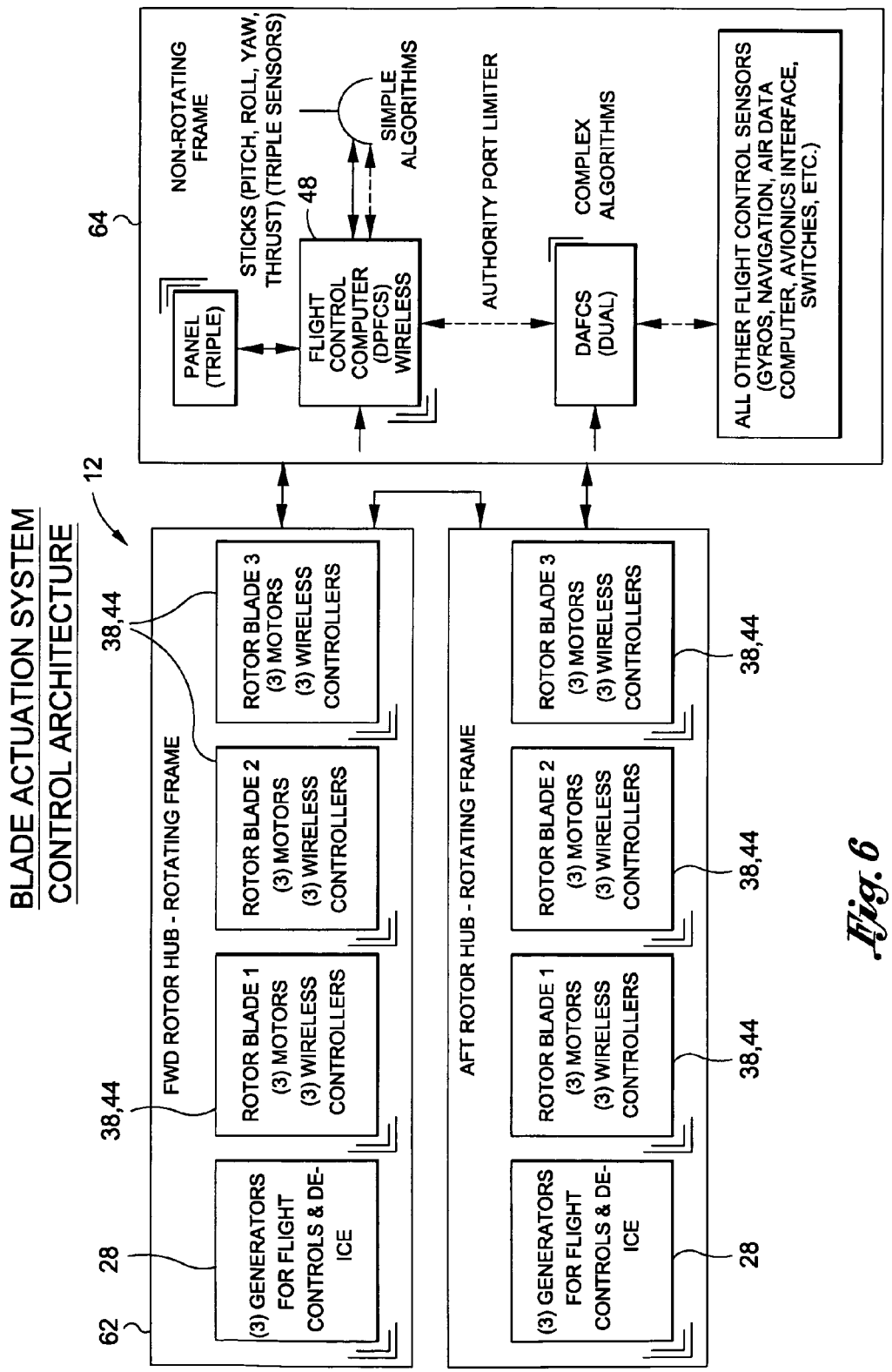
FIG. 6 is a schematic illustration of a blade actuation system control architecture for a dual main rotor configuration and illustrating a rotating frame portion (i.e., rotor blades, generators, motors) and a non-rotating frame portion (i.e., fuselage, flight control system).

Referring to FIG. 6, the control system architecture for the blade actuation system 12 is illustrated for the non-rotating and rotating frame 62s of an exemplary dual main rotor helicopter 10 having forward and aft rotating hubs. As can be seen, the blade actuation system 12 replaces the conventional swashplate. Three generators 28 are provided with each rotor head 16 wherein the generators 28 provide dedicated power to the motors 38 in their system according to the preferential system arrangement illustrated in FIG. 5 and described above. The generators 28 can also provide power for de-ice and lighting for the rotor blades 22. The generators 28 and motors 38 are preferably in wireless communication with one another such as via the wireless controllers. The aft and forward hubs in the rotating frame 62 are also preferably in wireless communication with one another.

Referring still to FIG. 6, wireless communication is preferably provided between the rotating and non-rotating frames 64 although hardwire communication is contemplated. Pilot commands may be provided via mechanical linkage to the digital primary flight control system (DPFCS) with authority limited communication preferably provided from the digital automatic flight control system (DAFCS).

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A blade actuation system, comprising:
a rotor shaft;
a rotor hub fixedly connectable to the rotor shaft;
a plurality of rotor blades connectable to the rotor hub;
at least one generator configured to rotate with the rotor shaft for generating power;
a plurality of motors operatively coupled to the rotor blades, the motors being configured to receive power from the generator; and
a plurality of flight control computers operative to provide control signals to the generator and motors for regulation thereof;
wherein:
the motors being responsive to the control signals for rotating the rotor blade in order to change a pitch angle thereof;
the generator and the motors being communicatively coupled to each other and to each one of the flight control computers, the generator, the motors, and the flight control computers being configured to communicate data information to and from each other.

2. The blade actuation system of claim 1 wherein the flight control computer is configured to wirelessly communicate with the generator and motors.

3. The blade actuation system of claim 2 wherein the wireless communication is in at least one of the following forms: optical, infrared, radio frequency.

4. The blade actuation system of claim 1 further comprising:
at least one tie bar interconnecting at least one of the rotor blades to the rotor hub;
wherein:
the tie bar is configured to conduct power from the generator to at least one of the motors.

5. The blade actuation system of claim 1 wherein:
the rotor shaft has n of the generators mounted thereon;
each rotor blade having n of the motors operatively coupled thereto.

6. The blade actuation system of claim 1 further comprising n of the flight control computers.

7. The blade actuation system of claim 5 wherein:
one of the motors for each of the rotor blades being powered by a common one of the generators such that a failure of the generator causes shutdown of one of the motors in each rotor blade.

8. The blade actuation system of claim 5 wherein n is equal to three such that the motors driving any one of the rotor blades provide triple redundancy in actuating pitch angle changes for the rotor blade.

9. The blade actuation system of claim 8 wherein each one of the three motors coupled to the rotor blade is force-summed to allow pitch angle changes in the event of a hardover failure of two of the three motors.

10. The blade actuation system of claim 1 further comprising:
a gear ring;
wherein:
the generator includes a pinion gear cooperatively engaged to the gear ring such that rotation of the rotor hub causes generation of power by the generator.

11. The blade actuation system of claim 10 wherein:
the gear ring is annular;
the pinion gear is engaged to an interior of the annular gear ring.

12. The blade actuation system of claim 1 further comprising:
a power source configured to provide power to the motors during non-rotation of the rotor hub.

13. The blade actuation system of claim 1 further comprising:
a pitch hinge interposed between the rotor blade and the rotor hub and having a gear wheel mounted to the pitch hinge;
wherein;
each one of the motors includes a pitch gear cooperatively engaged to the gear wheel.

14. A helicopter, comprising:
a rotor shaft;
a rotor hub fixedly connectable to the rotor shaft;
a plurality of rotor blades connectable to the rotor hub;
a plurality of generators configured to rotate with the rotor shaft for generating power;
a plurality of motors operatively coupled to the rotor blades, the motors being configured to receive power from the generators; and
a plurality of flight control computers operative to provide control signals to the generators and motors for regulation thereof;
wherein:
the motors being responsive to the control signals for rotating the rotor blade in order to change a pitch angle thereof;
the generator and motors being communicatively coupled to each other and to each one of the flight control computers, the generator, the motors, and the flight control computers being configured to communicate data information to and from each other.

15. A blade actuation system for effectuating changes in pitch angle of a rotor blade connected to a rotor hub, comprising:
at least one generator mounted to the rotor hub and being configured to generate power during rotation of the rotor hub; and
a plurality of motors mounted to the rotor blade and being configured to be powered by the generator for effectuating changes in the rotor blade pitch angle;
a plurality of flight control computers configured to regulate the operation of the motors;
the generator and motors being communicatively coupled to each other and to each one of the flight control computers, the generator, the motors, and the flight control computers being configured to communicate data information to and from each other.

16. A method of individual blade control of a rotor blade, comprising the steps of:
coupling the rotor blade to a rotor hub mounted to a rotor shaft;
providing at least one generator, a plurality of motors, and a plurality of flight control computers, the generators, the motors, and the flight control computers being configured to communicate data information to and from each other;
actuating the motors; and
changing a pitch angle of the rotor blade in response to actuation of the motors.

17. The method of claim 16 wherein the generator is rotatable with the rotor hub, the method further comprising the step of:
generating power by rotating the rotor hub; and
providing power to the motors.

18. The method of claim 17 wherein at least one tie bar interconnects the rotor to the rotor hub, the method further comprising the step of:
conducting power through the tie bar.

19. The method of claim 16 further comprising the steps of:
generating control signals using the flight control computers; and
transmitting the control signals to the motors wirelessly.

20. The method of claim 16 wherein the rotor hub includes a plurality of the generators in communication with the flight control computers and wherein if communication fails between one of the generators and the flight control computers, the method further comprising the step of:
routing the communication through at least one of the remaining generators.

* * * * *